G. & J. W. Gibbs

Dynamometer

Nº 15,608.  Patented Aug. 26, 1856.

UNITED STATES PATENT OFFICE.

GEORGE GIBBS AND JOHN W. GIBBS, OF CANTON, OHIO.

DYNAMOMETER.

Specification of Letters Patent No. 15,608, dated August 26, 1856.

*To all whom it may concern:*

Be it known that we, G. GIBBS and J. W. GIBBS, of Canton, in the county of Stark and State of Ohio, have invented certain new and useful Improvements in Dynamometers; and we do hereby declare that the following is a full and exact description thereof, in which—

Figure 1:
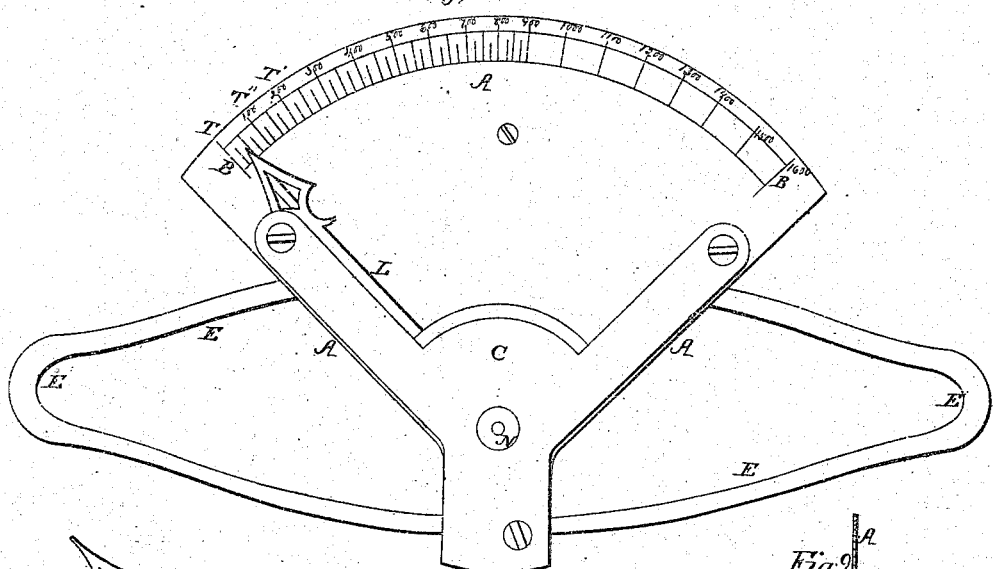
Figure 3:
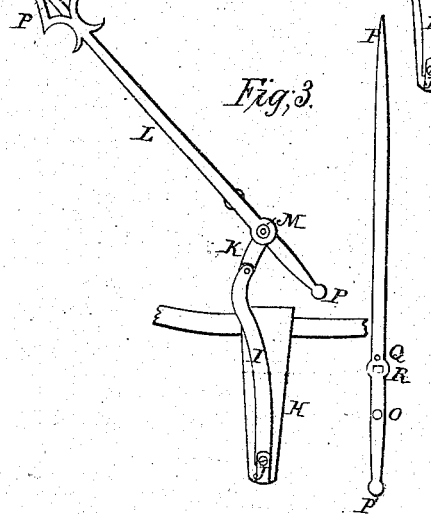
Figure 2:
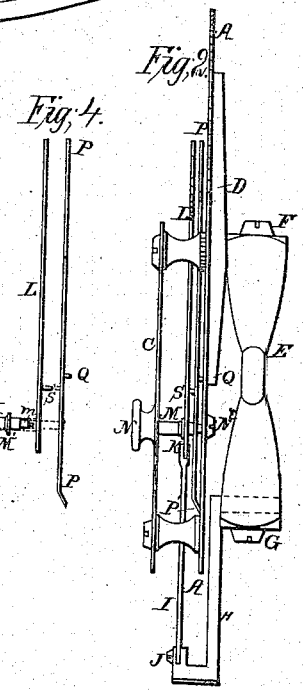

Figure 1, is a view of the improved instrument; Fig. 2, a side view of the same and Figs. 3, and 4, are detached sections which will be referred to in description.

The letters denote like parts in the several figures.

A, represents the index plate, upon which is graduated the scale B, Fig. 1; in front of the index plate is secured in any convenient manner, the plate C, leaving a space between the plates as seen in Fig. 2. To the back of the plate A, is secured the rib D, to which is secured one side of the elliptic spring E, by means of a screw at F. To the opposite side of the elliptic spring is attached, by the screw G, the arm H, which turns at right angles at the end, so as to form a connection with the connecting rod I, by a pin joint at J. The opposite end of the rod is attached by a pin joint, to the arm K, Figs. 2 and 3, which forms a limit of the pointer L. This pointer is firmly attached to the shaft M, the bearings of which are in the bushes N. N'. These bushes screw into the plates A, and C.

Figure 4:
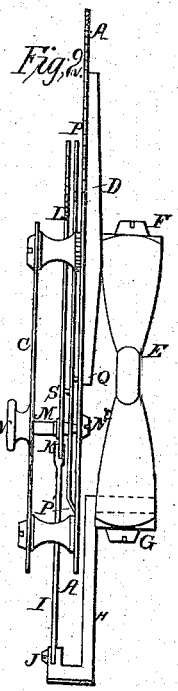

The pointer L, is permanently secured to the shaft M, and fits close to the collar M', Fig. 4, so that the shaft and pointer L, will move simultaneously. In the short limb of the pointer P P' is the hole O, Fig. 3, which receives that section of the shaft indicated at $m$, Fig. 4, it being smaller than the other part of the shaft, a shoulder is formed thereby, which prevents the pointer from slipping longitudinally in that direction, and to prevent its moving in a reverse direction. The end P', of the pointer is curved and forms a slight spring which presses lightly against the index plate as seen at P', Fig. 2. This spring end P', and the point Q, which is secured to the pointer, touches the face of the index plate as seen at P', and Q, Fig. 2. By means of the spring end P', point Q and the shoulder formed at $m$, the pointer P P' is prevented from any lateral movement upon the shaft, at the same time the pointer is so fitted to the section $m$, Fig. 4, that the pointer will vibrate upon it independently of the shaft M and pointer L, and vice versa. When the pointer L, is secured to the shaft, the pointer P P', is slipped on to the section $m$, and at the same time the pin S, passes into the oblong slot R, and by means of the pin S, in the slot the pointer P P', is actuated.

This arrangement holds the pointer P, P' in any position it may indicate upon the plate, and to prevent the continual vibration consequent upon dynamometers as before constructed, the oblong hole R, is made in the pointer which receives the pins S, which is secured to and projects from the pointer L, as seen in Figs. 2, and 4. This arrangement of the auxiliary pointer P, P', and its connection with the pointer L, distinguishes our invention from all others.

To test the amount of power required in the draft of plows, harvesters, mowers, and for other like purposes, one of the ends E', of the elliptic spring, is attached by a hook to the clevis on the machine, and the other end of the elliptic spring, is connected in a similar manner, to the doubletree attached to the team. By this means the minor axis of the elliptic will be contracted or extended according to the power applied to the major axis of the elliptic, and the amount of power will be indicated by the pointers on the dial, the pointers being connected with the spring E, in the manner before described.

The pointer L, in passing from T, to T', moves the pointer P, P', by means of the pin S, in the slot R. This slot allows the pointer L, to vibrate from T', to T'', without moving the pointer P, P', which shows the precise amount of draft by the dial. The amount of draft cannot be definitely shown by the pointer L, as its vibration extends from T' to T'', or more, which shows variation from one to two hundred pounds; in testing the draft of plows, this variation is very apparent, from the difference in the nature of the soil in one field, and from obstructions, such as stones, roots, &c., which in some cases would move the pointer to some four or five hundred, and in other places it would only indicate some two hundred. This, and the continual vibration of the pointer, owing to the various tensions of the elliptical spring, even in uniform draft, only gives the minimum and maximum draft, which varies so much in some cases, that no positive average can be obtained of the draft of various plows, mowers &c. But by the application of our improvement, the average draft or power is always indicated by the pointer P, P', without regard to the variations of the pointer L, and may be noted with certainty, and in case the pointer should be turned to a high point by an accidental tension of the spring, the pointer P, P', will move backward with the other in the flexing of the spring, to the average point of draft. A pin S, may be put on each side of the pointer L, attached to the pointer P, P', so as to operate substantially the same as the slot.

What we claim as our invention and desire to secure by Letters Patent, is,

The register, or pointer P, P', which shows the average mean draft, in combination with the slot R, and pin S, or its equivalent, which overcomes the vibrating motion of the pointer L, shown on the dial, substantially as set forth.

GEORGE GIBBS.
JOHN W. GIBBS.

Witnesses:
JOHN BRAINERD,
W. K. MILLER,
A. KENDALL,
W. H. BURRIDGE.